United States Patent [19]

McGill

[11] Patent Number: 5,893,485

[45] Date of Patent: Apr. 13, 1999

[54] DISPENSING MECHANISM

[75] Inventor: Gary Shane McGill, Rochester, United Kingdom

[73] Assignee: McGill Technology Limited, United Kingdom

[21] Appl. No.: 08/454,327

[22] PCT Filed: Dec. 16, 1993

[86] PCT No.: PCT/GB93/02572

§ 371 Date: Jun. 16, 1995

§ 102(e) Date: Jun. 16, 1995

[87] PCT Pub. No.: WO94/13154

PCT Pub. Date: Jun. 23, 1994

[30] Foreign Application Priority Data

Dec. 7, 1992 [GB] United Kingdom .................. 9226307
Mar. 11, 1993 [GB] United Kingdom .................. 9305018

[51] Int. Cl.$^6$ ........................................ B65D 35/30
[52] U.S. Cl. ................ 222/95; 222/103; 222/105; 222/146.6; 141/82; 141/114; 141/270; 141/284; 100/125; 426/516
[58] Field of Search ................ 141/82, 114, 269, 141/270, 284; 222/95, 103, 105, 146.6; 100/125; 426/516, 517

[56] References Cited

U.S. PATENT DOCUMENTS

| Re. 32,379 | 3/1987 | Touzani | 215/1 C |
|---|---|---|---|
| D. 268,840 | 5/1983 | Reed | D7/300 |
| D. 272,404 | 1/1984 | Angelakos | D7/17 |
| D. 285,082 | 8/1986 | Verkler | D15/82 |
| D. 307,754 | 5/1990 | Osrow et al. | D15/82 |
| D. 364,175 | 11/1995 | Alpers et al. | D15/82 |
| D. 365,496 | 12/1995 | McLinden et al. | D7/379 |
| 1,663,677 | 3/1928 | Byerly | 222/95 |
| 2,120,640 | 6/1938 | Craemer . | |
| 2,242,407 | 5/1941 | Tobey | 62/254 |
| 2,401,417 | 6/1946 | Engle . | |

(List continued on next page.)

FOREIGN PATENT DOCUMENTS

| 0448571 | 5/1948 | Canada | 92/45 |
|---|---|---|---|
| 0285709 | 4/1987 | European Pat. Off. . | |
| 246052 | 11/1987 | European Pat. Off. | 222/95 |
| 0314209 | 5/1989 | European Pat. Off. . | |
| 0362112 | 4/1990 | European Pat. Off. . | |
| 406134 | 1/1991 | European Pat. Off. . | |
| 1168470 | 1/1957 | France | 92/44 |
| 1219079 | 5/1960 | France . | |
| 3618634 | 12/1987 | Germany | 222/105 |
| 0378615 | 2/1940 | Italy | 92/45 |
| 649587 | 1/1989 | Japan . | |
| 372974 | 12/1963 | Switzerland . | |
| 1300386 | 12/1972 | United Kingdom . | |
| 2230057 | 10/1990 | United Kingdom . | |
| 2234556 | 2/1991 | United Kingdom . | |
| 82/00456 | 2/1982 | WIPO | 222/103 |
| 8703557 | 6/1987 | WIPO . | |
| 8805014 | 7/1988 | WIPO . | |
| 8905096 | 6/1989 | WIPO . | |
| 9005697 | 5/1990 | WIPO . | |

OTHER PUBLICATIONS

Restaurant Equipment Dealer, Apr. 1960, p. 5, #462 Supreme Bowl, bottom right corner.

*Primary Examiner*—J. Casimer Jacyna
*Attorney, Agent, or Firm*—Gifford, Krase, Groh, Sprinkle, Anderson & Citkowski, P.C.

[57] ABSTRACT

A dispensing mechanism is primarily intended for dispensing food products, such as ice cream, in semi-solid form. The machine has particular application in dispensing portion-sized containers of product. The containers (10) are filled with product through an open end which is then fitted with a closure member (11). The containers are then located in a discharge unit (25, 29) and the container (10) or the closure member (11) is deformed on operation of the unit. The product is discharged through an outlet which may be in the closure member or in the container.

45 Claims, 7 Drawing Sheets

U.S. PATENT DOCUMENTS

| | | | |
|---|---|---|---|
| 2,408,704 | 10/1946 | Taylor | 222/160 |
| 2,558,887 | 7/1951 | Tesiero | 222/146.6 |
| 2,559,840 | 7/1951 | Arthur | 222/146.6 |
| 2,631,761 | 3/1953 | Gates | 222/390 |
| 2,752,068 | 6/1956 | Bryant | 222/529 |
| 3,081,920 | 3/1963 | Gorychka et al. | 222/509 |
| 3,104,031 | 9/1963 | Wagner | 222/390 X |
| 3,155,281 | 11/1964 | Stracey | 222/107 |
| 3,157,314 | 11/1964 | Nadler . | |
| 3,178,061 | 4/1965 | Giacalone | 222/146 |
| 3,250,433 | 5/1966 | Christine | 222/129 |
| 3,288,333 | 11/1966 | Valk, Jr. | 222/386.5 |
| 3,330,129 | 7/1967 | Halverson et al. | 222/145 |
| 3,349,973 | 10/1967 | Smith | 222/380 |
| 3,371,822 | 3/1968 | Galloway | 222/95 |
| 3,413,820 | 12/1968 | Paquin . | |
| 3,435,996 | 4/1969 | Jones | 222/386.5 |
| 3,677,443 | 7/1972 | Smadar | 222/94 |
| 3,826,409 | 7/1974 | Chilcoate | 222/109 |
| 4,022,031 | 5/1977 | Calim | 62/66 |
| 4,098,434 | 7/1978 | Uhlig | 222/94 |
| 4,155,304 | 5/1979 | Schweisser et al. | 101/366 |
| 4,163,802 | 8/1979 | Redfern et al. | 426/43 |
| 4,169,548 | 10/1979 | Bond | 222/505 |
| 4,213,545 | 7/1980 | Thompson et al. | 222/386.5 |
| 4,231,492 | 11/1980 | Rois | 222/1 |
| 4,293,082 | 10/1981 | Matsueda | 222/131 |
| 4,335,835 | 6/1982 | Beigler | 222/95 |
| 4,386,717 | 6/1983 | Koob | 222/94 |
| 4,420,948 | 12/1983 | Savage | 62/340 |
| 4,423,829 | 1/1984 | Katz | 222/95 |
| 4,452,823 | 6/1984 | Connolly | 426/115 |
| 4,458,830 | 7/1984 | Werding | 222/131 |
| 4,484,697 | 11/1984 | Fry, Jr. | 222/95 |
| 4,492,313 | 1/1985 | Touzani | 215/1 C |
| 4,506,988 | 3/1985 | Reed | 366/203 |
| 4,574,987 | 3/1986 | Halligan et al. | 222/107 |
| 4,651,538 | 3/1987 | Bull et al. | 62/398 |
| 4,660,740 | 4/1987 | Brandon, Jr. et al. | 222/1 |
| 4,711,373 | 12/1987 | Christine | 222/327 |
| 4,711,376 | 12/1987 | Manfroni | 222/146.1 |
| 4,722,457 | 2/1988 | Bedwell et al. | 222/103 |
| 4,723,688 | 2/1988 | Munoz | 222/88 |
| 4,753,371 | 6/1988 | Michielin et al. | 222/145 |
| 4,773,458 | 9/1988 | Touzani | 150/55 |
| 4,775,564 | 10/1988 | Shriver et al. | 222/95 X |
| 4,796,784 | 1/1989 | Spirk et al. | 222/80 |
| 4,871,001 | 10/1989 | Nobuta et al. | 141/279 |
| 4,913,713 | 4/1990 | Bender | 62/3.61 |
| 4,921,135 | 5/1990 | Pleet | 222/82 |
| 4,921,147 | 5/1990 | Poirier | 222/527 |
| 4,938,386 | 7/1990 | Roethel et al. | 222/92 |
| 5,002,193 | 3/1991 | Touzani | 220/666 |
| 5,027,698 | 7/1991 | Chirnomas | 141/98 |
| 5,048,724 | 9/1991 | Thomas | 222/95 |
| 5,060,826 | 10/1991 | Coleman | 222/95 |
| 5,069,364 | 12/1991 | McGill | 222/95 |
| 5,071,034 | 12/1991 | Corbiere | 222/80 |
| 5,090,963 | 2/1992 | Gross et al. | 222/105 X |
| 5,100,025 | 3/1992 | McGraw | 222/95 |
| 5,150,820 | 9/1992 | McGill | 222/95 |
| 5,188,261 | 2/1993 | Butters | 222/105 X |
| 5,215,222 | 6/1993 | McGill | 222/95 |
| 5,232,027 | 8/1993 | Tanaka et al. | 141/270 |
| 5,265,764 | 11/1993 | Rowe et al. | 222/95 |
| 5,269,428 | 12/1993 | Gilbert | 215/100 |
| 5,305,924 | 4/1994 | Groover et al. | 222/129 |
| 5,333,761 | 8/1994 | Davis et al. | 222/212 |
| 5,361,941 | 11/1994 | Parekh et al. | 222/95 |
| 5,405,054 | 4/1995 | Thomas | 222/95 |
| 5,407,093 | 4/1995 | McGill | 220/666 |
| 5,421,484 | 6/1995 | Beach | 222/96 |
| 5,435,463 | 7/1995 | Hodgson | 222/105 |
| 5,463,878 | 11/1995 | Parekh et al. | 62/394 |
| 5,464,120 | 11/1995 | Alpers et al. | 222/1 |
| 5,492,249 | 2/1996 | Beach | 222/96 |
| 5,505,336 | 4/1996 | Montgomery et al. | 222/82 |

1

DISPENSING MECHANISM

BACKGROUND OF THE INVENTION

1. Field of the Invention

This invention relates to dispensing mechanisms in particular, but not exclusively, to dispensing mechanisms for dispensing food products such as ice cream or chilled confectionery products usually of semi-solid form.

2. Description of the Prior Art

It has been proposed to dispense ice cream from large containers in individual portions by, for example, hand operation using scoops. It has also been proposed to dispense ice cream from machines as by soft serve machines in which the product is mixed, and frozen, or by dispensing machines in which pre-packaged ice cream is delivered from an ice cream container.

All these known systems are limited by one or more factors such as expensive machinery, slow rate of dispensing, narrow range of product, deterioration of bulk product not used, consistency of portion control, limited flavour selection etc.

A further possibility is the making up of individual portions in a factory and packaging the portions for individual use. Such individual portions cannot be readily employed in certain outlets, such as restaurants or in certain receptacles such as glass or dishes, and the nature of the receptacles in which the individual portions are sold is limited by the cost effectiveness of the packaging receptacle.

An object of the invention is to provide a dispensing mechanism which overcomes at least some of the above disadvantages and which is flexible, cost effective and meets a gap in the existing market.

SUMMARY OF THE INVENTION

According to one aspect the invention provides, in a method of dispensing a viscous or semi-solid food product, introducing the product into a dispensing container through an inlet opening, sealing the container including said opening, the container having a closable outlet through which the product is to be dispensed, and the container being sized to contain a predetermined portion of food product and the container having a deformable part to be engaged and deformed by a deforming means, operating the deforming means to cause the deformable part to engage and to pressurise the product within the container and to cause the product to discharge from the container through said outlet, supporting the container during operation of the deforming means to counteract the action of the deforming means, and receiving the product from the container in a receptacle positioned below said outlet, the capacity of the container and the receptacle being matched in size so that said predetermined portion corresponds to the size of the receptacle.

Conveniently the container is sized to receive a predetermined portion which is substantially the same size as the capacity of the receptacle. Alternatively the container is a multi-portion container.

Prior to the introduction of product into the container a plurality of containers are nested together, i.e. a container is located one within another. Similarly before assembly of the lid part with the body part, a plurality of lid parts are nested together, or the lid parts are supplied off a roll of such parts.

Conveniently the filled, sealed container of product is assembled with the receptacle for storage and transport from the place of filling to the place of dispensing, the receptacle, if present, fitting over the body part of the container.

According to another aspect the invention provides a container for dispensing a viscous or semi-solid food product, comprising an opening for receiving the food product during filling of the product into the container, a closure member for the opening, and an outlet for discharge of product, the container being of a shape which permits two or more of the containers to be nested together one inside the other, and the walls of the container being deformable between the closure member at one end of the container and the opposite end of the container whereby upon deforming the container walls the internal volume of the container is reduced and product in the container is discharged through the outlet.

Preferably the container in order to be nestable has a body which is generally cone shaped, generally a truncated cone or pyramid, or generally part spherical. The container conveniently has a flat side surface so that labelling on the closure member or base is visible to show labelling in the desired orientation when the container is stored in display cabinets.

Conveniently the outlet is formed in the closure member and is at said one end of the container.

According to another aspect the invention provides a container for dispensing a viscous or semi-solid food product comprising a base part and a top or lid part, the top part being deformable and arranged to be sealed to the base part, the base part having an outlet so that upon deformation of the top part towards the base part product within the container is caused to pass through the outlet from the container, the base part retaining its initial configuration. The container is preferably a multi-portion container and it may have two or more outlets. Each outlet may be associated with an outlet valve.

Conveniently the top part is formed with sheet material having undulations which deform to adopt the shape of the internal wall of the base part of the container. The top part may be formed by thermoforming or roll or sheet material or by injection moulding.

According to another aspect of the invention a dispensing system for dispensing a viscous or semi-solid food product comprises a container having an opening through which product is filled into the container, a closure member for the opening, and an outlet for discharge of product from the container, the container being of a shape which permits two or more of the containers to be nested together one inside the other and the walls of the container being deformable between the closure member at one end of the container and the opposite end of the container, the system further comprising drive means including a plunger engageable with the container at said opposite end thereof, whereby upon operation of the drive means the container is deformed and the internal volume of the container is reduced and product in the container is discharged from the outlet.

According to a still further aspect of the invention a dispensing system for dispensing a viscous or semi-solid food product comprises a container for the product, the container having a base part and a top part, the top part being deformable and arranged to be sealed to the base part, and a plunger arranged to engage the top part to deform said part and urge it into the base part to reduce the internal volume of the container, the base part having at least one outlet so that, during operation of the deforming means to deform the top part, product within the container is caused to pass through the outlet from the container, the base part retaining its initial configuration.

In one arrangement the deforming means includes drive means having a plunger which is shaped to correspond to the internal shape of the walls of the base part of the container so that when the plunger has completed a discharge movement the container is substantially emptied of product with the top part being located adjacent the internal walls of the base part. In the latter position it is preferred that the interior of the container remains sealed except for the outlet.

Preferably the base part of the container is of part pyramidal, conical or of generally part spherical shape over its internal wall and the lower surface of the plunger engaging the top portion is of corresponding pyramidal, conical or generally part spherical shape. In this arrangement the top part is substantially rectangular or circular over its external periphery to engage with the top of the base part. The base part and the top part may be attached to one another, after admission of product to the base part, by welding around the periphery of the top portion, by a clip arrangement, or otherwise.

Preferably the plunger is adjustable in its external dimensions whereby, as the plunger moves along the container during a discharge movement, the plunger adjusts to a changing cross-section of the container between said top part and said base part.

The mechanism may also comprise a receiving or abutment member for receiving and supporting the container in use and acting as an abutment during discharge of the container. For this purpose the receiving member may be shaped according to the external surface of the container and may include an opening through which product is discharged from the container. Below the receiving member may be located a platform on which a receptacle for the product is locatable to receive product discharged from the container.

As an alternative to a reciprocal plunger the receiving member may be reciprocally movable towards and away from a fixed plunger to effect discharge of the container.

The container may be releasably associated with a receptacle, such as a cup, which encloses the lower part of the container and is removable therefrom when dispensing of the product is to take place.

The container may be formed so that the base part is nestable with other base parts prior to filling with product. Similarly the receptacle is also nestable with other receptacles prior to assembly with the container.

When the containers are to be employed they are de-nested from one another, filled with product using a predetermined amount of product, the top part is then sealingly attached to the base part and, if used, the receptacle is mounted on the base part before or after filling with product. Mounting may be by way of a screw threaded, a close fit or other releasable connection.

Alternatively the top part is attached to the base part before filling with product, the product being introduced through the outlet before closing the outlet opening.

When using a reciprocal plunger the plunger movement may be achieved by a manually operated lever or by a power operated piston and cylinder arrangement driven by pressurised gas, hydraulic fluid, or other drive means. The plunger may be deformable to adapt to the shape of the container as it is operated.

The system may include a storage arrangement for charged containers and the storage arrangement may include means for keeping the product at the desired dispensing temperature. It is also possible for the containers to be housed in a storage compartment and presented at the discharge position on the receiving member by conveyor means, such as a carousel arrangement. Alternatively the containers are housed in feed hoppers or feed magazines and are located in the dispensing position by vacuum or other placing means. Otherwise the containers are manually placed in a dispensing position before the mechanism is operated to discharge the product.

The discharge outlet or outlets from the container may each take the form of a discharge opening in the base portion of the container when in use and the opening may be shaped to shape the product as it is discharged. The outlet opening is in a closed condition, prior to a dispensing operation, preferably by a removable sealing member, by providing frangible means opened up by the pressure of the product, or both. The outlet or outlets may be sealingly engageable with a control valve and nozzle arrangement through which the product is discharged.

As an alternative to a simple outlet opening a duct or nozzle may project outwardly from the base part prior to a dispensing operation. The outlet duct may be inwardly directed and, upon generating internal pressure at the commencement of a dispensing operation the outlet duct is inverted and an outlet opening or nozzle is formed.

Preferably during dispensing of product the plunger is moved in a vertical direction and the container outlet is disposed at the lower end of the container.

Further features of the invention will appear from the following description of various embodiments of the invention given by way of example only and with reference to the drawings, in which:

DESCRIPTION OF THE PREFERRED EMBODIMENTS

Figure 1:
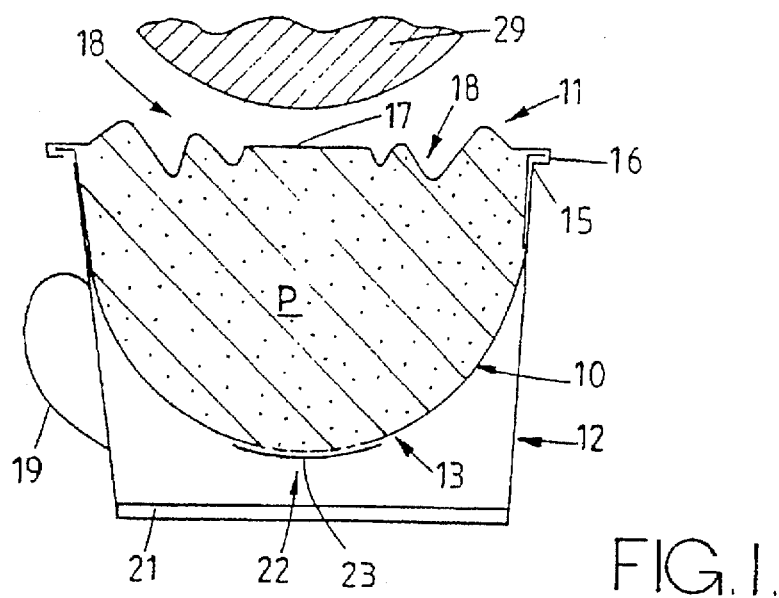
FIG. 1 is a cross sectional side elevation of one embodiment of an assembled and filled product container.
Figure 2:
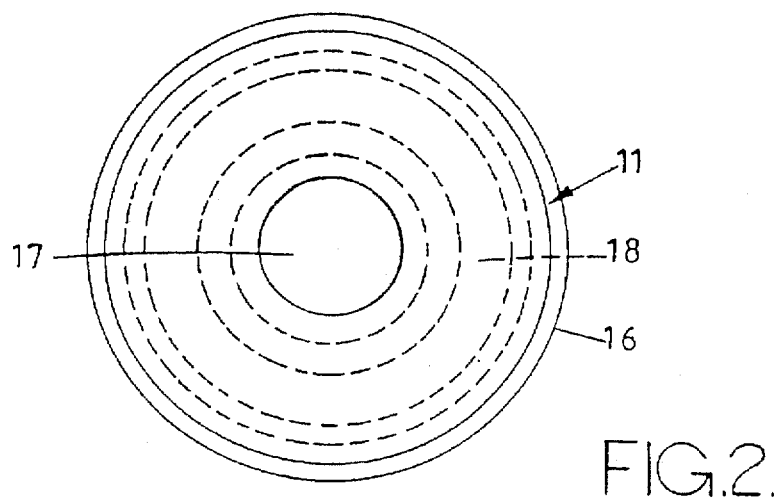
FIG. 2 is a plan view of the container of FIG. 1.
Figure 3:
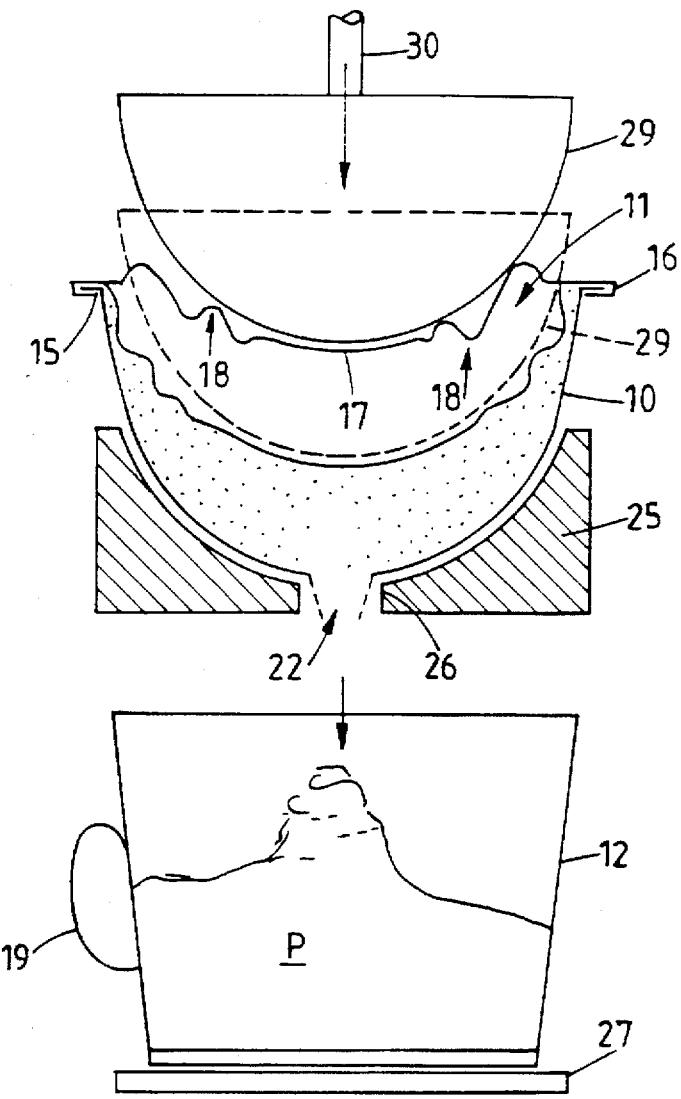
FIG. 3 is a side view, in section, of the container of FIG. 1 during a dispensing operation.
Figure 4:
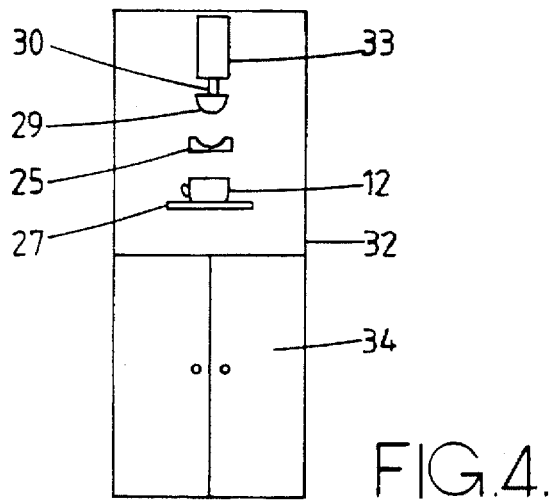
FIG. 4 is a side view of a dispensing mechanism for the container of FIGS. 1-3.
Figure 5:
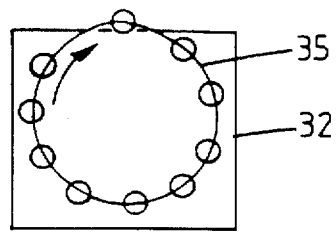
FIG. 5 is a plan view of a mechanism for presenting containers for dispensing.

Referring to the drawings and firstly to FIGS. 1–5 a dispensing system is shown which utilises the container shown in FIGS. 1–2 in the manner illustrated in FIG. 3, utilising the machine shown in FIG. 4.

In FIG. 1 is best seen one form of container assembly in an assembled condition. The container assembly, as shown, consists of three parts, a base part 10, a lid part 11, together constituting a container, and a receptacle 12. The base part 10 is a generally hemispherical part 13 at the centre of which is an outlet 22. Towards the upper end of the part 13 the walls are splayed or tapered outwardly terminating in a flange 15. The part 10 is conveniently made from aluminium, injection moulded plastics material or by thermomoulding.

To the upper end of the base part 13 is sealingly secured the lid part 11 which is generally circular in shape having an inturned lip 16 formed around its outer periphery, as shown, or a peripheral flange. The lip 16 or flange is arranged to cooperate with the flange 15 to enable the lid part 11 to be sealingly assembled with the body part 10 by the lip 16 engaging over the flange 15 and/or by welding the flange 15 to the lid portion 11.

The lid part 11 has a central, circular flat area 17 and between the area 17 and the peripheral edge of the portion 11 are formed undulations or corrugations 18. The lid is formed of material which is deformable, such as plastics material, whereby, as will be explained, the lid may be deformed to the shape of the internal wall of the base part 10. Instead of providing the undulations 18 the lid part 11 may be flat and formed of stretchable material.

Figures 1A, 1B:
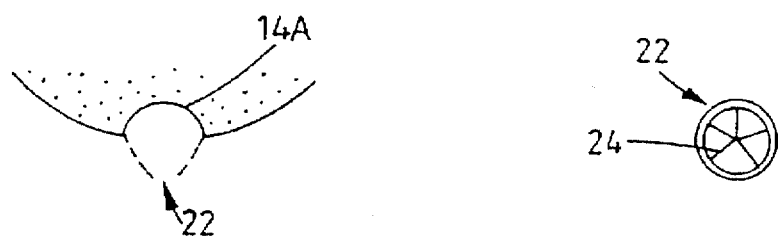
FIG. 1A is a scrap view showing an alternative form of part of the container of FIG. 1.
FIG. 1B is a view of the outlet of the container of FIG. 1.

The container comprising the body part 10 and the lid part 11 is assembled with a receptacle 12, in the nature of a cup, which is releasably assembled to the body part 10, as for example by providing interengageable screw threaded portions (not shown) on the receptacle 12 and the body part 10 or by a press fit. The receptacle extends from adjacent the lip 15 to below the level of the nozzle 14A (FIG. 1A) and may carry on one side a handle 19. At the lower end of the receptacle 12 is formed a base 21 which may be arranged to house a spoon or other eating implement (not shown) and/or ingredients of the food product such as toppings, syrups, etc.

Prior to assembly, as shown in FIG. 1, the receptacle 12 may be nested i.e. located one within the other with other receptacles for storage purposes and for presentation to assembly means. Similarly the body part 10 is nestable with other body parts, and the lid part 11 is nestable with other lid parts. The body part 10 is filled with product P by introducing a predetermined amount of product P into the body part 10 which may be by a filling mechanism of known form.

After filling, the filled body part is presented to a position in which the lid 11 is sealingly located on the body part 10 and, at the same time, or subsequently the receptacle 12 may be attached to the body part 10. The product may then be cooled and hardened to maintain product quality. The assembly is then ready for storage and for transportation to a site where the product is to be dispensed.

If desired the receptacle 12 may be omitted or, at the point of use, the receptacle 12 may be discarded. If the product within the container is to be kept frozen or chilled it is transported and stored in a refrigerated compartment. The container is primarily intended for frozen or chilled confectionery products of a solid or semi-solid nature. However it will be appreciated that other product may be located within the container and dispensed therefrom, particularly when such product is in a solid or semi-solid form but also if the product is of a creamy consistency or is liquid, and if the product is to be dispensed hot.

The outlet 22 is in a sealed condition prior to a dispensing operation. A closure member 23 may be employed, covering the base of the container, which is adhered around the opening 22 and is removed prior to a dispensing operation by peeling off the member 23, or otherwise. Alternatively, or in addition, the outlet 22 may be formed with frangible means integral with the portion 10 whereby upon commencement of a dispensing operation the frangible means breaks open and permits the closure member to be displaced to an open condition. Thus for example, with reference to FIG. 1B, the closure member 23 may be formed with a series of radial weakened portions 24 so that upon applying a dispensing pressure to the product within the body part 10 the weakened portions 24 break open thereby creating an outlet for the product. As a further alternative the outlet 22 may be formed as an outlet nozzle. In this case the outlet nozzle may, prior to a discharge operation, extend into the body part 10 as shown at 14A in FIG. 1A. Upon the product within the body part 10 becoming under pressure the nozzle 14A is pushed outwards and turns inside out, at the same time being opened to create an outlet opening 22. For this purpose the nozzle 14A may be formed with frangible means such as described in relation to FIG. 1B.

Referring now particularly to FIG. 3 the product container 10, 11 is disassembled from the receptacle 12 for a dispensing operation. The part 13 is seated on a receiving member 25 with the opening 22 directed towards an opening 26 formed in the receiving member 25. The receiving member 25 is rigidly mounted on a dispensing machine, as shown in FIG. 4, and is positioned above a platform 27 on which the receptacle 12 or other receiving means is located.

The receiving member 25 is positioned below a plunger 29 which is reciprocally movable towards and away from the member 25. The plunger 29 is carried on the lower end of a rod 30 and the lower surface of the plunger 29 has a generally hemispherical shape corresponding to the shape of the lower part of the body part 10. The plunger 29 is shaped to be admitted to the body part 10 upon a downward movement which is a dispensing movement of the plunger 29.

Over an initial part of the downward movement of the plunger 29 the hemispherical surface of the plunger engages the lid part 11 and begins to deform the lid part downwardly. As the plunger moves and the lid part 11 deforms, product within the container body part 10 is put under pressure and is thereby caused to discharge from the outlet 22. The outlet 22 is opened manually by removal of the closure member 23 or automatically upon pressure building on the frangible means. Product issues from the opening 22 into the receptacle 12 during continued downward movement of the plunger 29. During said downward movement the lid part 11 continues to deform as indicated in FIG. 3 until, at the completion of a downward movement of the plunger 29, the plunger and lid part lies adjacent the inner surface of the body part 10 and the product is substantially wholly discharged through the outlet 22 from the container.

After full discharge of product the plunger 29 is moved upwards to its start position, the body part 10 is removed from the receiving member 25 and discarded. During the discharge operation the lid part 11 remains secured to the body part 10 and sealed thereto so that product cannot leave the body part 10 except through the outlet 14.

After a discharge of product has been achieved, the receptacle 12 may be removed from the platform 27 for consumption of product. The operation of the dispensing mechanism can then be repeated for a further container, or, in the case of a multi- portion container, by continued discharge of the existing container.

As will be seen from FIG. 4 the plunger 29, receiving member 25 and platform 27 are vertically spaced one above the other on a housing 32. The housing 32 has a storage compartment 34 in which containers to be dispensed may be located at a suitable temperature provided by, for example, refrigeration means (not shown). The housing 32 may also contain a power source for operating the plunger 29.

The plunger 29 may be reciprocally movable by power means 33 which may take the form of a gas or hydraulically powered piston and cylinder arrangement or other drive means. In the case of a gas powered piston and cylinder the gas may be from a pneumatic motor or from a gas cylinder.

Figure 11:
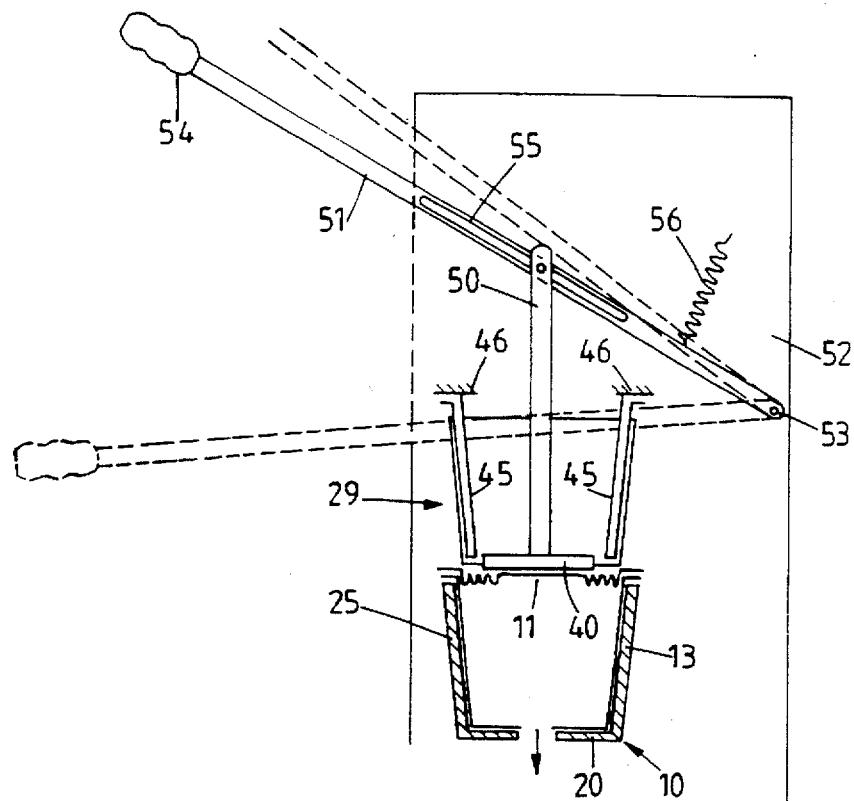
FIG. 11 is a side elevation of a container during a dispensing operation showing an alternative dispensing system.

As an alternative to a power operated plunger 29 the plunger may be manually movable by a lever mechanism (see FIG. 11).

Although in FIG. 4 only a single dispensing position is shown, it will be appreciated that multiple dispensing positions may be provided located side by side or on individual units.

As an alternative to having a reciprocal plunger 29 a static plunger element 29 may be provided and the receiving member 25 may be mounted to be reciprocal towards and away from the plunger member 29. In the latter arrangement the receiving member may be mounted on an arm extending outwardly from the housing 22, the means for reciprocally moving the member 25 being housed within the housing 32.

As thus far described the dispensing operation is manually operated, that is the individual containers are placed manually on the receiving surface 25 to be dispensed. Alternatively the containers may be located within the housing 32 and a plurality of containers located on a conveyor mechanism such as shown at 35 in FIG. 5. In this arrangement a carousel is provided which is rotatable about a central axis in increments so that after each incremental movement a container is presented to the receiving member 25 for a dispensing operation. In this way the dispensing system can be utilised in a self serve, for example coin-operated, arrangement whereby the user inserts a coin to obtain the presentation of a container in the dispensing position. Moreover the containers, whilst within the housing 32, can be maintained at the desired temperature. It will be appreciated that other arrangements can be made for presenting the containers to a dispensing position.

In the system described it will be appreciated that the containers will generally comprise a single portion of product to be dispensed. More than one portion may be dispensed into a single receptacle. Alternatively the dispensing operation may be interrupted to provide two or more portions from each container, i.e. multi-portion dispensing. By the provision of more than one dispensing position different products from different containers can be dispensed successively into one receptacle.

It will also be appreciated that the receptacle can be of the user's choice, for example a plate, a cone, a bowl or a dish as an alternative to the receptacle 12 illustrated and as an alternative to cones or other edible receptacles.

Although there is described and shown a container having a generally hemispherical shape the container body 10 may take other forms. For example a container body may be tapered inwardly and of circular, square or rectangular section, see for example FIGS. 6–8. However in order to obtain discharge of product from the container part 10 the plunger 29 should be correspondingly shaped and the lid part 11 must be shaped to fit around the upper end of the body part 10.

Referring now to FIGS. 6–11 an alternative form of container and dispensing mechanism is shown. In FIGS. 6–11 the same reference numbers are used for parts which are equivalent to parts of the embodiment of FIGS. 1–5.

Figure 6:
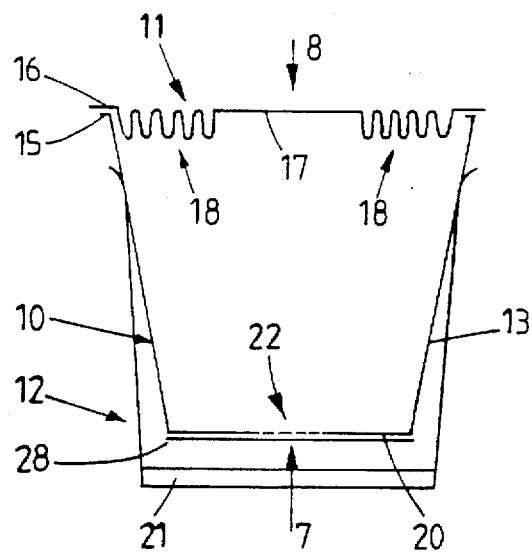
FIG. 6 is a cross sectional side elevation of a second embodiment of an assembled and filled container.
Figure 7:
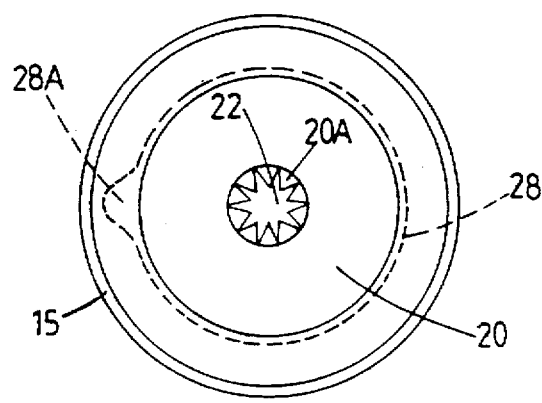
FIG. 7 is an underneath view of the container of FIG. 5 in the direction of arrow 7.
Figure 8:
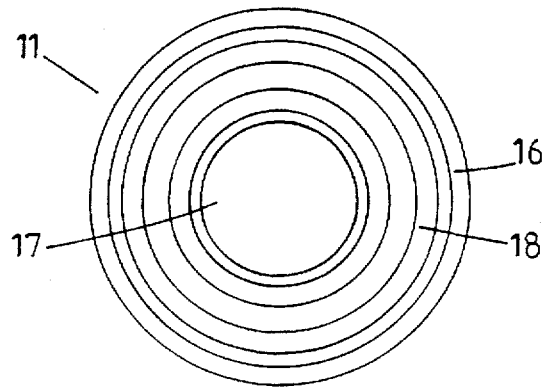
FIG. 8 is a plan view of the container of FIG. 6 in the direction of arrow 8.

The container in FIGS. 6–8 is formed of a body part 10 which is of part cone shape or truncated cone shape; it has side walls 13 which taper inwardly towards a circular base 20. At the centre of the base 20 is provided an outlet 22 which is formed as an opening in the wall of the base 20 and the opening has a star shape defined by inward projections 20A from the outer edge of the opening which serve to shape product discharged through the opening.

The outlet opening 22 is sealed prior to use by a closure member 28 which is adhered to the base 20 around the opening 22 and has a tab 28A. To unseal the opening 22 the member 28 may be peeled off using the tab 28A or the pressure of product on the member 28 at the commencement of a dispensing operation causes the closure member 28 to be released from the base 21D. In the latter case the tab 28A may be adhered to the part 10 and extend outwardly of the side wall.

The container has a lid part 11 of similar form to that of FIGS. 1–5. The receptacle 12 is also of similar form to that of the preceding embodiment and is sized to be a close fit over the body part 10 so that it is secured to the body part 10. As already explained the container shape may be different from those illustrated and may be elliptical, square or rectangular in cross-section with a correspondingly shaped lid part 11. In each case the body part is tapered towards its lower end to be nestable with other body parts with the parts fitting inside one another to reduce storage requirements.

Figure 9:
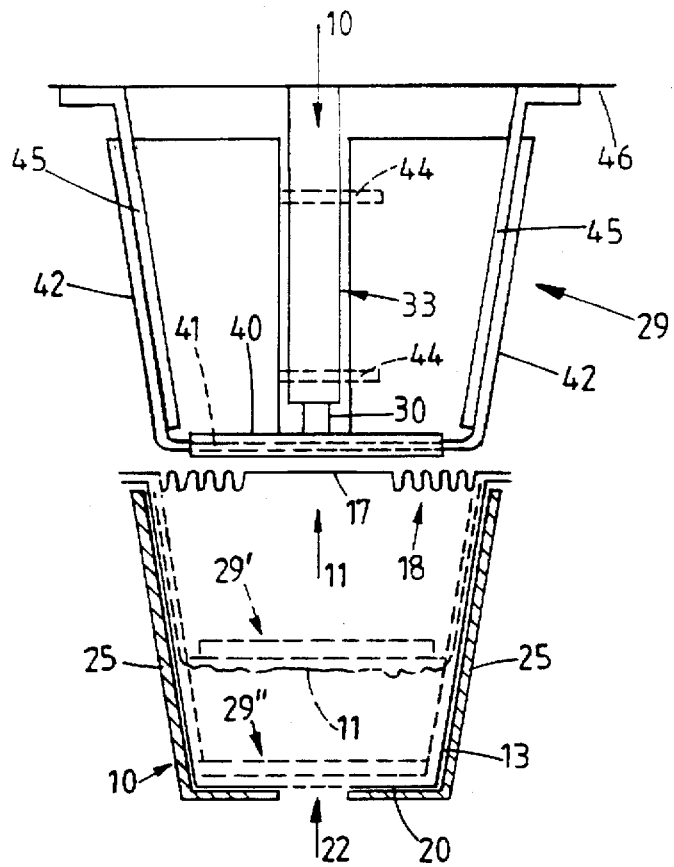
FIG. 9 is a side elevation of the container of FIGS. 6-8 during a dispensing operation.
Figure 10:
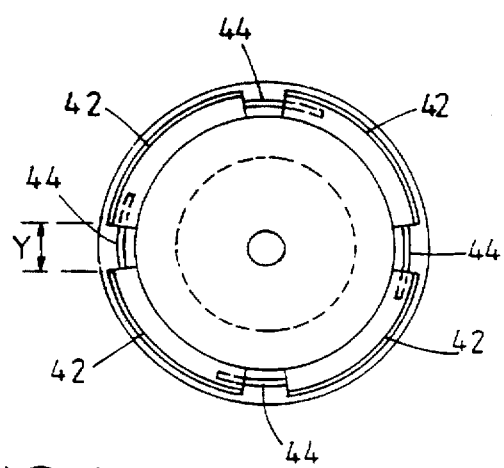
FIG. 10 is a view in the direction of arrow 10 in FIG. 9.

FIGS. 9 and 10 show a dispensing mechanism for use with the container of FIGS. 6–8. As with the preceding embodiment of FIGS. 1–5 a reciprocal plunger 29 is employed but in the present case the plunger is able to adapt its shape to conform to the tapering cross-section of the container as the plunger progresses down the container during a dispensing operation.

The plunger 29 of FIGS. 9 and 10 is carried on a piston and cylinder 33 having a piston rod 30 which is secured to a plunger plate 40 which is circular and formed with a peripheral slot 41 extending circumferentially of the plate 40. The slot 41 receives the lower ends of four adjustable plunger members 42 which extend upwards from the slot 41 in alignment with the internal side walls of the body part 10 of the container.

The members 42 are spaced circumferentially from one another around the plate 40 a distance Y when the plunger is in its uppermost position and, as the plunger is urged downwards, the members 42 move radially inwards and into the slot 41 until the members 42 are closely adjacent one another in the lowermost position of the plunger 29. Each of the members 42 is formed with pins 44 which extend towards and engage in a corresponding opening in an adjacent member thereby serving to locate and guide the members 42 in relation to one another during movement of the plunger.

Further guidance for the members 42 is provided by fixed slide members 45 mounted on a framework 46 and directed downwards in sliding contact with an internal wall of each of the members 42. The slide members 45 are aligned with the plunger members 42 to ensure that the members remain in their outer position as the plunger moves downwards in which outer position the members 42 are adjacent the inner surface of the inclined wall of the container body 10. The slide members 45 are omitted from FIG. 10 for clarity. The plunger plate 40 may be of rectangular shape especially if the plunger is rectangular for rectangular containers.

If desired the plunger assembly may be enclosed within a resilient membrane, sleeve, or sock (not shown) which is capable of urging the members 42 towards the operative position of FIGS. 9 and 10 and constraining the assembly against outward movement. The membrane also acts to maintain hygienic conditions and may be washable.

It will be appreciated that as the plunger 29 moves downwards in a discharge movement the lower face of the plunger plate 40 engages the top of the lid part 11 of the container over its central area 17. The lower ends of the plunger members 42 engage the outer area of the lid part 11 so that the plunger deforms the lid part as the plunger descends. Upon progressive movement of the plunger 29 downwards the deformation of the lid part 11 continues, as at 29', and the plunger members 42 move radially inwards to accommodate the progressively reduced cross-section of the container body 10. As the plunger 29 approaches the base 20 of the container body 10, as at 29", the plunger parts 42 become fully retracted into the slots 41 in the plunger plate 40 and the plate 40 substantially fully occupies the cross-section of the part 10.

In this position the lid part 11 is fully deformed so that it lines the internal walls of the body 10 and the product is substantially fully discharged through the outlet 22.

During the discharge operation the container body part 10 is supported by support members 25 in which the container has been located. The receptacle 12 is located under the outlet 22 to receive the product P as it is discharged and the product in the receptacle 12 is shaped by the outlet shape. Product does not normally come into contact with any of the parts of the apparatus other than the container and the receptacle so there are no cleaning problems.

After discharge the plunger 29 is retracted and the empty container removed from the support member 25. A fresh full container is locatable on the member 25 and the plunger 28 is in position to make another discharge movement.

Instead of the combined container and receptacle being separated before a dispensing operation the receptacle may remain associated with the container and be pushed off the container during admission of product.

In FIG. 11 is shown a dispensing mechanism in most respects the same as for the embodiment of FIG. 9 except that in this case a manually operated lever arrangement is used instead of the power operated piston and cylinder 33.

The plunger 29 of FIG. 11 is carried rigidly on a rod 50 which extends upwards for slidable connection to a lever arm 51 pivoted on the housing 52 at one end 53 and having at the other end a handle 54. The upper end of the rod 50 is slidably arranged in a slot 55 in the arm 51 and a spring 56 urges the arm 51 and hence the plunger 29 to its uppermost position. The lever 51 may be moved between the lower and upper chain line positions shown which represent the discharge and container release positions.

It will be appreciated that two or more dispensing positions may be provided to increase dispensing capacity. Usually these will be located side by side and in independent or common housings. Storage for filled containers will be located adjacent the dispensing mechanism to maintain the product at the desired temperature for dispensing. In the FIG. 11 arrangement the housing may be cooled so that dispensing takes place in a cold environment.

Instead of the lever mechanism shown in FIG. 4 a gear/ratchet system may be employed in a manually operated system.

Referring now to FIGS. 12–16, FIGS. 12, 13 and 14 show another form of container in which the same reference numbers are used for similar parts to the previous embodiments. As shown the body 10 of the container is of circular section tapering towards its base 10A in which is formed a central circular opening 22 for discharge of product P from within the container 10.

The opening 22 is formed by flexible portions 22A of the base of the container defined by radial cuts 22B whereby the portions 22A can bend downwards upon the application of pressure to the contents of the container. A film of sealing material 23 is adhered to the base of the container over the outlet 22 and the film 22 contains radial cuts or perforations 23A whereby when the portions 22A bend the sealing material 23 separates along the cuts 23A thereby allowing the portions 22A to move downwards and an outlet opening to be formed. Alternatively the film 23 is peeled off before a dispensing operation.

A lid 11 of the container is sealingly located on the container body by engaging a lip 16 of the lid over the upper edge of the container. The lid 11 has a central flat region 17 and between the region 17 and the lip 16 the lid has a fold 18 which, with the lid in position on the container reaches substantially midway down the container. Thus upon pressure being applied to the region 17 this region can move downwards towards the base 10A, the folded part 18 unfolding until, when the region 17 reaches the base 10A, as shown in chain lines 17", the folded part 18 has unfolded and lies flush with the side walls of the container. During this action the product P is discharged through the opening 22.

Figure 12:
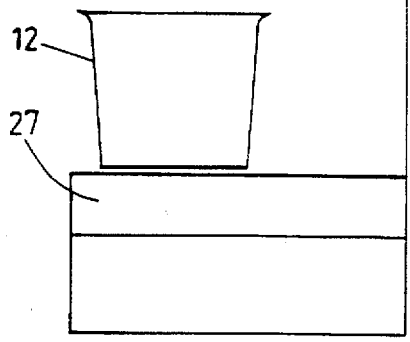
FIG. 12 is a side elevation, in section, of a further form of container.
Figure 12:
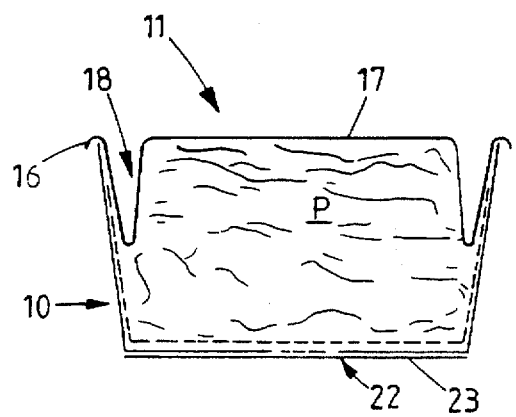
Figure 13:
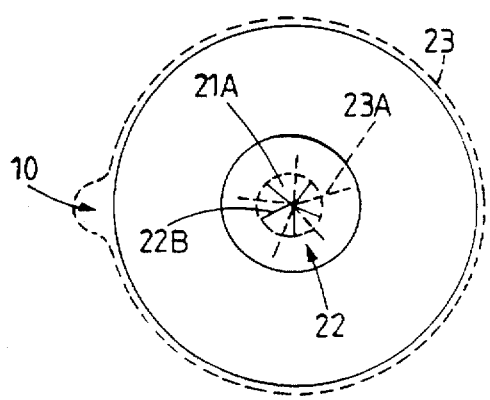
FIG. 13 is a view of the underside of the container of FIG. 12.

Other details of the container 10 of FIGS. 12 and 13 may be as in the preceding embodiments. For example the container may be of different shape, the upper edge of the container may include a flange and the edges of the opening 22 may be shaped to shape the product during discharge, or be formed with a nozzle.

The lid 11 of FIGS. 12 and 13 may be formed of plastics or other deformable material.

Figure 14:
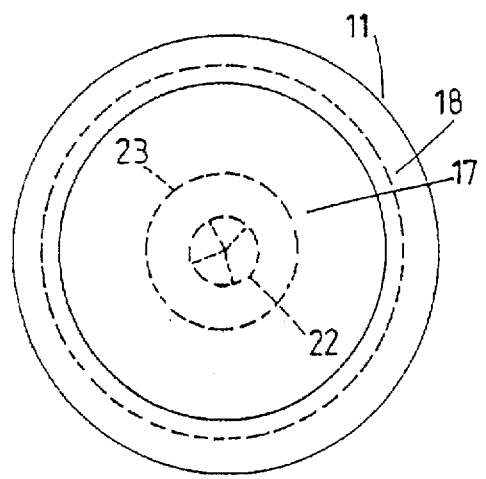
FIG. 14 is a plan view of the container of FIG. 12.
Figure 15:
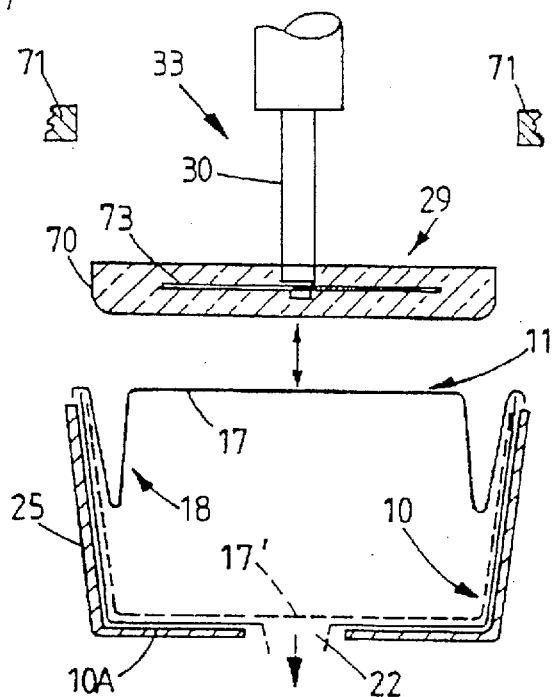
FIG. 15 is a side elevation, in section, of the container of FIG. 12 showing one form of discharge arrangement.

Referring now to FIG. 15 the container of FIGS. 12–14 is shown in use with an alternative form of discharge plunger 29 to that shown with the previous embodiments.

In this case the plunger 29 has a circular plunger head 70 carried on a piston rod 30 driven by a piston and cylinder device 33. The plunger 70 is substantially of the same size as or slightly less than the size of the upper end of the container 10 and is formed of flexible resilient material so that as the plunger 70 moves down the container the plunger deforms against the sides of the container and is thereby reduced in cross section, the plunger being capable of deformation to the size of the base 10A of the container.

Alternatively the plunger 70 may be formed of rigid material and of a diameter the size of the base of the container 10.

As the plunger 70 moves down the container product P is discharged from the container until, when the plunger is at the base of the container, substantially all the product has been discharged. Upon reversing the movement of the plunger 70 the container 10 is lifted from its seating 25 upwardly with the plunger due to engagement of the plunger with the container until the plunger reaches a position with the container clear of the seating 25 at which point the container engages with fixed abutments 71 in the path of the container which remove the container from the plunger. As this occurs the container is discharged into a bin (not shown) for used containers for disposal together with the lid 11 which remains associated with the container. The discharged container may be directed away from the dispensing area by discharge guides which may be in fixed positions or moved into position during the discharge cycle.

To secure the plunger to the piston 30 the piston may be secured to a rigid disc 73 embedded in the resilient material of the plunger 70 thereby enabling flexing of an outer annular part of the plunger to conform to the shape of the container during a discharge action.

Figure 16:
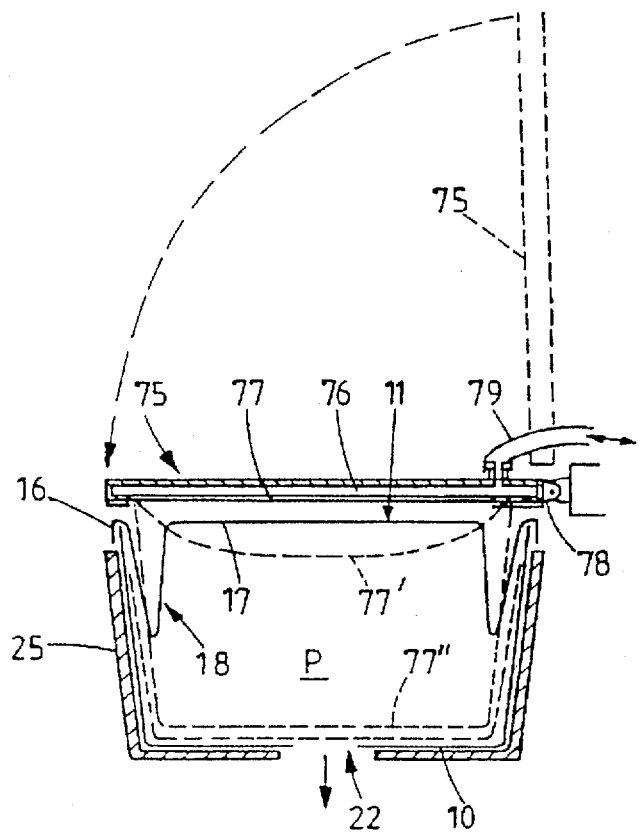
FIG. 16 is a side elevation corresponding to FIG. 13 showing another form of discharge arrangement.

FIG. 16 shows another discharge arrangement for the container of the invention. In this case the lid 11 of the container is deformed without using a plunger as such. Instead a pivotable unit 75 is locatable over the upper end of container/lid assembly and the unit 75 defines a chamber 76 to which pressurised air may be introduced through an inlet 79 from a source of compressed air (not shown). Alternatively the unit 75 may be vertically slidably arranged.

The underside of the chamber 76 is formed with a resilient membrane 77 of highly extensible material such as latex so that when air is introduced to the chamber the membrane 77 extends through the position 77' to a position 77" in which the membrane is in close association with the inner walls of the container. In extending to this position the membrane 77 engages with the portion 17 of the lid 11 and pushes the lid down into the container to discharge the product P from the container through the outlet 22.

The unit 75 is pivotable about a support 78 to one side of the container to move the unit 75 in and out of its operative position. As the unit moves to its inoperative upper position the membrane 77 may remain pressurised to draw the container 10 out of its seating 25 for disposal and to allow a further full container to be placed in the seating 25. Release of pressure in the chamber 76 enables quick release of the container from the unit 75.

Movement of the unit 75 between operative and inoperative positions may be by any convenient means, manually or by power operated drive means.

In any of the embodiments described the dispensing mechanism is located within a microwave unit including a housing surrounding the mechanism. When a container has been placed in a dispensing position the microwave unit is arranged to give a predetermined measure of microwave power to elevate the temperature of the product to the desired temperature for dispensing and serving. This arrangement may be particularly suited to dispensing frozen cocktail drinks or hot products. A microwave unit may be used to temper (heat up) the product as a separate step before location in the dispensing machine. Microwave heating is particularly advantageous with portion sized containers and by controlling the microwave power and duration the product can be heated to substantially the ideal temperature for dispensing.

Containers for dispensing may be located in storage in a tube, one end of which presents a container for use, the containers being resiliently urged towards said end.

Although as described the empty container is manually removed after discharge of the contents it is possible to provide a container removal arrangement (not shown) whereby the empty containers are removed from the support after withdrawal of the plunger by a removal mechanism. Such a mechanism may take various forms and would have the action of removing the container and dropping or placing the container in a suitable bin. For example a pick up arm may extend to engage the container and grasp or otherwise secure the container, then move it off the support to a discharge position at which the container is released.

Instead of the lid part 11 having undulations or corrugations as shown other means by which the lid part can be deformed when engaged by the plunger can be utilised. For example the lid part may be stretchable in the radial direction, the lid part may be formed with circumferential pleats or the arrangement of undulations may be different to that shown. Conveniently the lid part is vacuum formed or injection moulded plastics.

The container may be filled with a single product or the product may be layered with different products in different layers.

Referring now to FIGS. 17-21 there is shown alternative arrangements for deforming a container 10 filled with product to be dispensed to discharge the container. In FIGS. 17-21 the same reference numbers are used for similar parts in the previously described embodiments.

In each case the container 10 has a deformable body part open at one end to admit product into the container during filling of the container and, after filling the open end is closed and sealed by a closure member 11. The closure member 11 is secured in position by clipping over the open end, by welding or other convenient means.

The closure member 11 is formed with an outlet opening 22 which is sealed, prior to discharge of the container, by a seal 28 usually a film sheet adhesively secured to the member 11 over the whole surface of the member 11 and having an outwardly directed tab 28A.

The seal 28 may be released by peeling off the member, utilising the tab 28A.

Alternatively the seal 28 is provided with perforations 22A adjacent the outlet 22 which break open under pressure of product during discharge to release the product through the opening.

In each of the embodiments of container 20 shown in FIGS. 17-21 the body of the container is arranged to deform under the action of a plunger 29 driven reciprocally by drive means 30, such as a piston and cylinder device, hydraulically or pneumatically operated.

Thus the body of the container 10 is made of deformable material which will adopt a deformed condition, generally was shown at 10'. adjacent the lid 11, when approaching the fully deformed condition but without fracturing and allowing product to leave the container except through the outlet 22. Such material may be resilient plastics or metal, such as aluminium.

Figure 17:
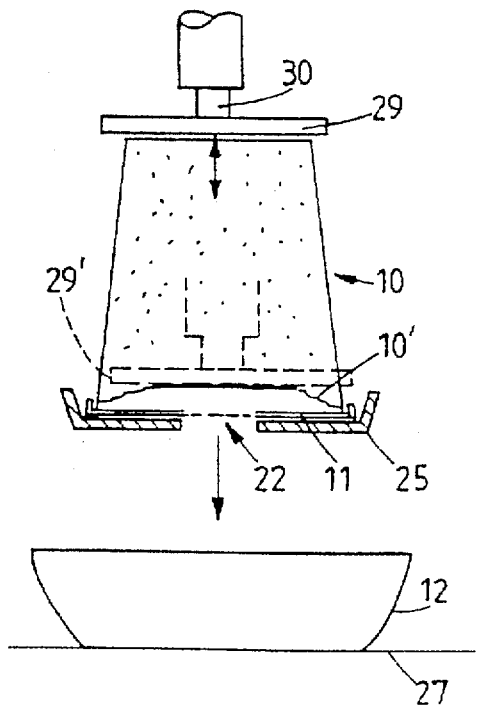
FIG. 17 is a side elevation of another form of dispensing mechanism utilising a deformable container.
Figure 18:
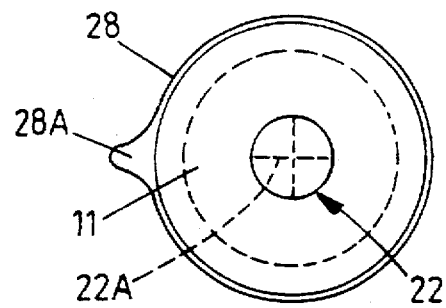
FIG. 18 is a view of the outlet end of the container of FIG. 17.

In the case of FIGS. 17 and 18 the container 10 is of truncated conical shape having a base portion formed by the lid 11 which need not deform and side walls which are readily deformable. If desired lines of weakness may be provided in the side walls to assist in bringing about the necessary deformation in use during dispensing.

In FIG. 17 the receptacle 12 is in the form of a dish which rests on a surface 27 during dispensing. The container 10 is located during dispensing with the lid 11 lowermost and engaging with an abutment 25.

Figure 19:
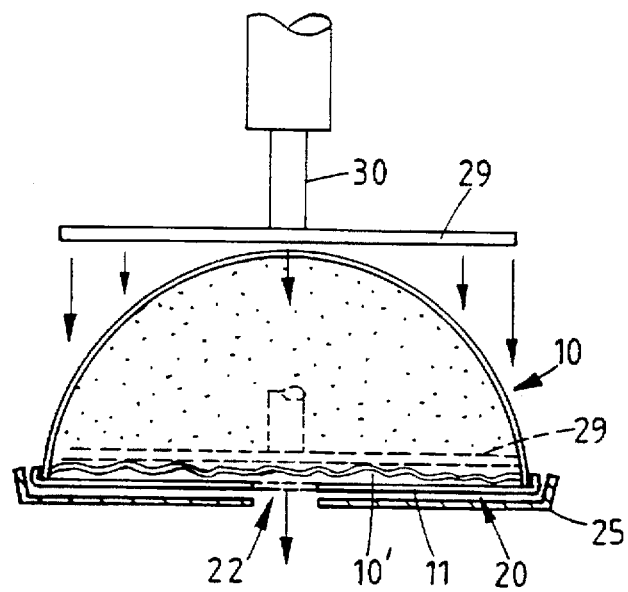
FIG. 19 is a side elevation of another form of dispensing mechanism utilising a deformable container.
Figure 20:
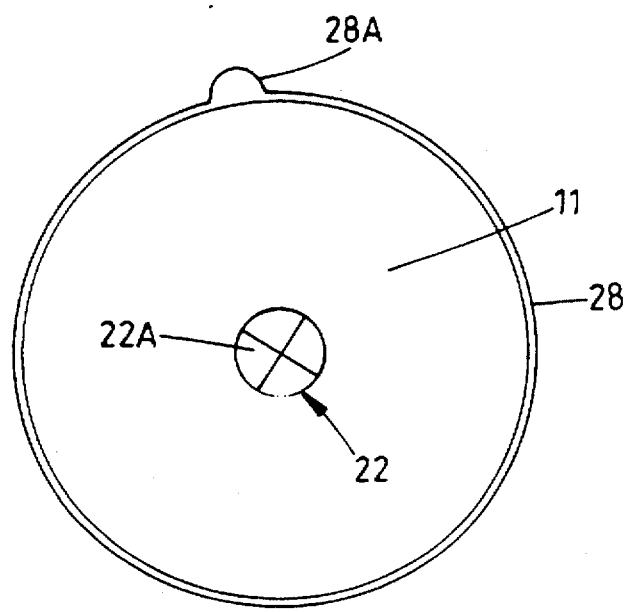
FIG. 20 is a view of the outlet end of the container of FIG. 19.

In the case of FIGS. 19 and 20 the container 10 is of generally hemispherical shape splayed apart towards its open end which in use receives the lid 11.

In deforming the container of FIGS. 19 and 20 the plunger 29 engages the end of the container remote from the lid 11 and urges it towards the lid crumpling the walls of the container until they lie adjacent the inner surface of the lid as shown generally at 10'.

Figure 21:
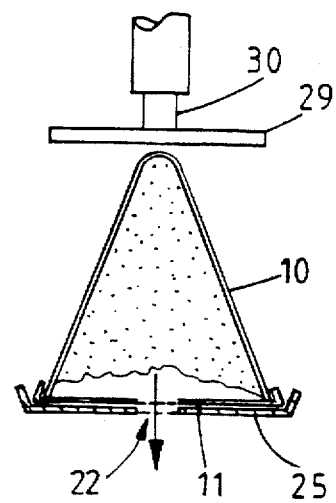
FIG. 21 is a side elevation of a still further form of dispensing mechanism utilising a deformable container.

The container of FIG. 21 is generally as for the containers of FIGS. 17 and 18 and FIGS. 19 and 20 except that in this case the container 10 is of cone shape with a curvilinear apex. The side walls of the container of FIG. 21 deform during a discharge operation so that they approach the inner surface of the lid 11.

In each of the containers of FIGS. 17 and 18, 19 and 20, and 21 the containers are, when not filled with product and when the lids 11 are not fitted, capable of being nested together, that is the containers fit one inside the other. This enables containers, when made, to be transported to a filling location in a nested condition and occupying relatively little space.

It will be appreciated that, at least in the embodiment of container of FIGS. 17 and 18, the outlet 22 may be in the base of the container adjacent where the container is engaged by the plunger 29. In this case the outlet may discharge product past the plunger and the system may be in an inverted position compared with that shown. Moreover two or more outlets may be provided especially with a container of multi-portion capacity.

In each of the embodiments of container of FIGS. 1–4, 6–8, 9–10, 12–16, 17 and 18, 19 and 20, and 21 the product container 10 may be a multi-portion container in which case the receptacle 12 for receiving the product will be of less capacity than the container. When the container is for single portions it may have a size of say 50 cc or greater but when the container is for multiple portions it may have a capacity of several litres or up to 40 litres.

Similarly in the embodiments of FIGS. 1–4, 6–8, 9–10, 12–16, 17–18, 19–20 and 21, especially when the container is of the kind having a multi-portion capacity, there may be two or more of said outlets 22 for dispensing at two or more locations. Each of the outlets may sealingly communicate with outlet valves (not shown) whereby discharge from the outlets is controlled and the valves each discharge product through a discharge nozzle into a receptacle.

In each of the embodiments employing a reciprocal plunger the drive to the plunger may be by a hydraulically operated piston which gives greater control of pressure at the plunger. The plunger piston may include a positional sensor and, according to signals from the sensor the pressure of the piston may be increased and decreased. For example it may be desirable to increase pressure as the plunger approaches the end of its operative travel. In addition the pressure may be time controlled so that, for example, when a predetermined period elapses after the plunger operates pressure is released so that the pressure in the product is released between servings.

By the construction of the container and the dispensing system employed it will be seen that there are fewer complications arising out of the need for cleanliness. Product is only in contact with disposable portions of the system so no cleaning should be required. A wide variety of product can be dispensed and the system offers the opportunity of manual, semi-automatic or fully automatic dispensing.

The system will find application in restaurants or at point of sale outlets. There are low power requirements in the dispensing operation, particularly when one portion dispensing is utilised. The machine is very compact and easily usable by untrained personnel. It provides mobility and when dispensing cold products utilising thermal storage systems it may be possible to operate the system without any power supply and thereby be fully portable.

The system lends itself particularly to dispensing from containers in which a single portion of product is located whereby each portion is separately and freshly dispensed. The product is readily heated up or tempered to a dispensing temperature and microwave heating may be utilised.

The invention claimed is:

1. A dispensing system for dispensing a viscous or semi-solid food product comprising a container having an opening through which product is filled into the container, a closure member for the opening and at least one outlet for discharge of product from the container, the container being of a shape which permits at least two of the containers to be nested together one inside the other and the walls of the container being invertibly deformable between the closure member at one end of the container and the opposite end of the container, the system further comprising drive means including a plunger engageable with the container at said opposite end thereof, whereby upon operation of the drive means the container is invertibly deformed and the internal volume of the container is reduced so that substantially all product in the container is discharged from the outlet.

2. A dispensing system according to claim 1 wherein the container is shaped to define an internal receiving space for the product.

3. A dispensing system according to claim 1 wherein the container has a body which has a spherical portion in which the outlet is formed.

4. A dispensing system according to claim 1 wherein the container has a body which retains its initial configuration during the extrusion of product.

5. A dispensing system according to claim 1 wherein a central part of the closure member is arranged to deform from an outwardly directed shape to an inwardly directed shape.

6. A dispensing system according to claim 1 wherein the closure member is formed with a central area of sheet material which is a deformable portion which deforms to adopt the shape of an internal wall of the container.

7. A dispensing system according to claim 1 wherein the closure member has at least one inwardly and outwardly directed portion bounding a central area.

8. A dispensing system according to claim 1 wherein the container and the closure member are sealingly attached to one another, after admission of product to the container, by inter-engagement of outer edges of the closure member and upper edges of the container.

9. A dispensing system according to claim 1 associated with a receptacle removably attachable to the container and for receiving product from the outlet during dispensing.

10. A dispensing system according to claim 1 wherein said at least one outlet is in the form of a discharge opening in the container, the container having releasable closure means for said opening.

11. A dispensing system according to claim 1 wherein the closure member is of a shape which permits at least two closure members to nest together with one another.

12. A method of dispensing a viscous or semi-solid food product, in which the product is introduced into a container base of a container assembly through an inlet opening of said base, sealing the container base inlet opening with a closure member, placing the assembly on a seating, discharging product from the container assembly through an outlet in the container base, operating deforming means to deform a deformable portion of the closure member into the base member to cause the product to be extruded from the container through said outlet, the seating supporting the container during the action of the deforming means and receiving product from the container in a receptacle positioned below said outlet, the container base being nestable with other container bases when empty of product and before assembly with respective closure members.

13. A method according to claim 12 wherein the container assembly is sized to receive a predetermined portion of product which is substantially the same size as the capacity of the receptacle.

14. A method according to claim 12 wherein a plurality of closure members are nested together, prior to assembly with the container base.

15. A method according to claim 12 wherein a filled, sealed container assembly is assembled with said receptacle for storage and transport from the place of filling to the place of dispensing, the receptacle fitting over the container base.

16. A method according to claim 12 wherein a central part of the closure member comprising the deformable portion which part is deformed from an upwardly directed shape to an inwardly directed shape.

17. A method of dispensing a viscous or semi-solid food product, said method comprising introducing the product into a dispensing container through an inlet opening, sealing the container including said opening, the container having a closeable outlet through which the product is to be dispensed, and the container being sized to contain a predetermined portion of food product and the container having a deformable part to be engaged and deformed by a deforming means, operating the deforming means to cause the deformable part to engage and to pressurize the product within the container and to cause substantially all the product to discharge from the container through said outlet, supporting the container during operation of the deforming means to counteract the action of the deforming means, and receiving the product from the container in a receptacle positioned below said outlet, the capacity of the container and the receptacle being matched in size so that said predetermined portion corresponds to the size of the receptacle, wherein the filled, sealed container of product is assembled with the receptacle for storage and transport from the place of filling to the place of dispensing, the receptacle fitting over a body part of the container.

18. A method according to claim 17 wherein the container is size to receive a predetermined portion which is substantially the same size as the capacity of the receptacle.

19. The method according to claim 17 wherein, prior to the introduction of product to the container, a plurality of containers are nested together with one container located within another.

20. Dispensing apparatus for use in dispensing product from containers in which the container has a container base portion in which the product is received and a second portion associated sealingly with said base portion, the second portion having a deformable part which is deformed during dispensing, the base portion having a seating surface, the apparatus including a supporting member defining an abutment on which the seating surface is supportable during dispensing of product, and reciprocal drive means arranged to engage the deformable part to deform said part and urge it into the base portion to reduce the internal volume of the base portion, the container base portion having at least one discharge outlet, the outlet having a cross-section less than that of the container, and the container being arranged so that, during operation of the drive means to deform the deformable part, product is extruded through the outlet from the container, the container base portion being of a shape which permits at least two base portions to be nested together with one inside the other.

21. Dispensing apparatus according to claim 20 wherein the second portion of the container is a closure member for the base portion and the base portion defines an opening for admitting product, which opening is sealed by the closure member.

22. Dispensing apparatus according to claim 20 wherein the drive means includes a plunger which is shaped according to the shape of the internal walls of the base portion of the container so that, when the plunger has completed a discharge movement, the container is substantially emptied of product with the deformable part of the second portion being located adjacent the internal walls of the base portion.

23. Dispensing apparatus according to claim 20 wherein the lower surface of the plunger engaging the second portion is of part spherical shape.

24. Dispensing apparatus according to claim 20 wherein the drive means includes a plunger which is adjustable in its external dimensions whereby, as the plunger moves during its discharge movement, the plunger adjusts to a changing cross-section of the base portion.

25. Dispensing apparatus according to claim 24 wherein the plunger is formed of interconnected parts which are arranged to move and adjust inwardly and towards one another during said discharge movement.

26. Dispensing apparatus according to claim 20 wherein the supporting member is shaped according to the shape of the external surface of the container base portion and the supporting member includes an opening through which product is discharged from the container outlet.

27. Dispensing apparatus according to claim 20 wherein the drive means includes a plunger driven by a power operated piston and cylinder.

28. Dispensing apparatus according to claim 20 wherein the drive means comprises a manifold pressurisable and having a portion moveable under pressure to engage and deform said deformable part.

29. Dispensing apparatus according to claim 20 comprising a storage arrangement for charged containers, the storage arrangement including refrigeration means for maintaining the product at a desired temperature.

30. Dispensing apparatus according to claim 20 comprising a conveyor arrangement for conveying containers from a storage compartment to a discharge position at the supporting member.

31. Dispensing apparatus according to claim 20 comprising heating means whereby the container of product is heated by microwave power prior to dispensing.

32. Dispensing apparatus according to claim 20 wherein the outlet is formed to shape the product extruded therethrough.

33. Dispensing apparatus according to claim 20 wherein the outlet is star shaped.

34. Dispensing apparatus according to claim 20 wherein the outlet is sealingly engageable with a control valve and nozzle arrangement through which product is extruded.

35. A container for use in the apparatus of claim 20 wherein the container comprises a base portion in which product is received and a second portion associated sealingly with the base portion, the second portion having a deformable part which is deformed during dispensing, the base portion having a seating surface arranged to be supported by an abutment of a supporting member of the apparatus during dispensing of the product from the container, the deformable part being arranged to be engaged by reciprocal drive means of said apparatus to deform said part and urge it into the base portion to reduce the internal volume of the container, the container base portion having at least one discharge outlet and said outlet having a cross-section less than that of the container, the container being arranged so that, during operation of the drive means to deform the deformable part, product is extruded through the outlet from the container, and the container base portion being of a shape which permits at least two base portions to be nested together with one inside the other.

36. A dispensing system for dispensing a viscous or semi-solid food product comprising a container for the product, the container having a base part and a top part, said top part comprising a closure member, the top part being invertibly deformable and arranged to be sealed to the base part, and a plunger arranged to engage the top part to invertibly deform said part and urge it into the base part to reduce the internal volume of the container, the base part having at least one outlet so that, during operation of the plunger to deform the top part, substantially all product within the container is caused to pass through the outlet from the container, the base part retaining its initial configuration, the base part of the container being arranged to be nestable with other base parts.

37. A dispensing system according to claim 36 wherein the plunger is shaped to correspond to the internal shape of the walls of the base part of the container so that when the plunger has completed a discharge movement the container is substantially emptied of product with the top part being located adjacent the internal walls of the base part.

38. A dispensing system according to claim 36 wherein the lower surface of the plunger engaging the top portion comprises a shape selected from the group consisting of part conical, part spherical, or part pyramidal.

39. A dispensing system according to claim 36 wherein the plunger is adjustable in its external dimensions whereby, as the plunger moves along the container during a discharge movement, the plunger adjusts to a changing cross-section of the container between said top part and said base part.

40. A dispensing system according to claim 39 wherein the plunger is formed of interconnected parts which are arranged to move and adjust inwardly and towards one another during said discharge movement.

41. A dispensing system according to claim 36 comprising a receiving member for receiving and supporting the container in use and acting as an abutment during discharge of the container, the receiving member being shaped according to the external surface of the container and including an opening through which product is discharged from the container.

42. A dispensing system according to claim 36 wherein drive means for the plunger comprises a power operated piston and cylinder, and the plunger is deformable to adapt to the shape of the container as it is operated.

43. A system according to claim 36 comprising a storage arrangement for charged containers, the storage arrangement including refrigeration means for maintaining the containers at a desired temperature.

44. A system according to claim 43 comprising a conveyor arrangement for conveying containers from a storage compartment to a discharge position on the receiving member.

45. A dispensing system according to claim 36 wherein the container of product is heated prior to dispensing by microwave heating means.

* * * * *